(12) United States Patent
Kamada

(10) Patent No.: US 11,772,433 B2
(45) Date of Patent: Oct. 3, 2023

(54) PNEUMATIC TIRE

(71) Applicant: Toyo Tire Corporation, Itami (JP)

(72) Inventor: Nobuyuki Kamada, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 17/881,729

(22) Filed: Aug. 5, 2022

(65) Prior Publication Data

US 2023/0068595 A1 Mar. 2, 2023

(30) Foreign Application Priority Data

Aug. 27, 2021 (JP) .................. 2021-139168

(51) Int. Cl.
*B60C 13/00* (2006.01)
(52) U.S. Cl.
CPC .................. *B60C 13/001* (2013.01)
(58) Field of Classification Search
CPC .............. B60C 13/001; B60C 13/02
See application file for complete search history.

(56) References Cited

U.S. PATENT DOCUMENTS

| | | | |
|---|---|---|---|
| 2013/0025755 A1* | 1/2013 | Nomura | B60C 13/02 152/209.16 |
| 2019/0023081 A1 | 1/2019 | Wabuchi et al. | |
| 2021/0155056 A1* | 5/2021 | Noguchi | B60C 13/02 |

FOREIGN PATENT DOCUMENTS

| | | |
|---|---|---|
| JP | S6340004 Y2 * | 10/1988 |
| JP | 2017-132296 A | 8/2017 |

OTHER PUBLICATIONS

Hasegawa, English Machine Translation of JP S6340004 Y2, 1988 (Year: 1988).*

* cited by examiner

*Primary Examiner* — Justin R Fischer
*Assistant Examiner* — Brendon Charles Darby
(74) *Attorney, Agent, or Firm* — WHDA, LLP

(57) ABSTRACT

In a pneumatic tire according to an embodiment, a spiral-shaped pattern is formed in a pattern forming area provided on a surface of a sidewall. The spiral-shaped pattern is formed by alternately providing ridges protruding from a reference surface in the pattern forming area and grooves recessed from the reference surface along a spiral while gradually changing the height and the depth with respect to the reference surface.

10 Claims, 9 Drawing Sheets

PNEUMATIC TIRE

CROSS-REFERENCE TO RELATED APPLICATION

This application is based upon and claims the benefit of priority from the prior Japanese Patent Application No. 2021-139168, filed on Aug. 27, 2021; the entire contents of which are incorporated herein by reference.

BACKGROUND OF THE INVENTION

1. Field of the Invention

An embodiment of the present invention relates to a pneumatic tire.

2. Description of the Related Art

There has been known a pneumatic tire provided with serrations formed of a plurality of ridges with a small width on a surface of a sidewall as a pattern, thereby making contrast of a dark part and a light part due to reflection of light between a portion where the pattern is provided and a portion where the pattern is not provided.

For example, JP-A-2017-132296 discloses a structure in which a pattern part formed of ridges whose ridge lines have curved parts in planar view are arranged in a nested structure having a central point is provided on a tire surface.

SUMMARY OF THE INVENTION

The pattern is formed of a plurality of ridges in related art as described above. In such case, a difference occurs in a rubber amount between the portion where the pattern is provided and the portion where the pattern is not provided, which may generate light spot (namely, hollow or underfill) in ridges at the time of molding.

In view of the above, an object of the present invention is to provide a pneumatic tire which can suppress occurrence of light spot.

According to an aspect of the present invention, there is provided a pneumatic tire including a spiral-shaped pattern in a pattern forming area provided on a surface of a sidewall, in which the spiral-shaped pattern is formed by alternately providing ridges protruding from a reference surface in the pattern forming area and grooves recessed from the reference surface along a spiral while gradually changing the height and the depth with respect to the reference surface.

The pneumatic tire according to the embodiment of the present invention is configured by including not only ridges but ridges and grooves. Accordingly, the rubber amount can be equalized between a portion where the pattern is provided and a portion where the pattern is not provided, which can suppress occurrence of light spot at the time of molding.

DESCRIPTION OF EMBODIMENTS

Hereinafter, embodiments of the present invention will be explained with reference to the drawings.

First Embodiment

Figure 1:
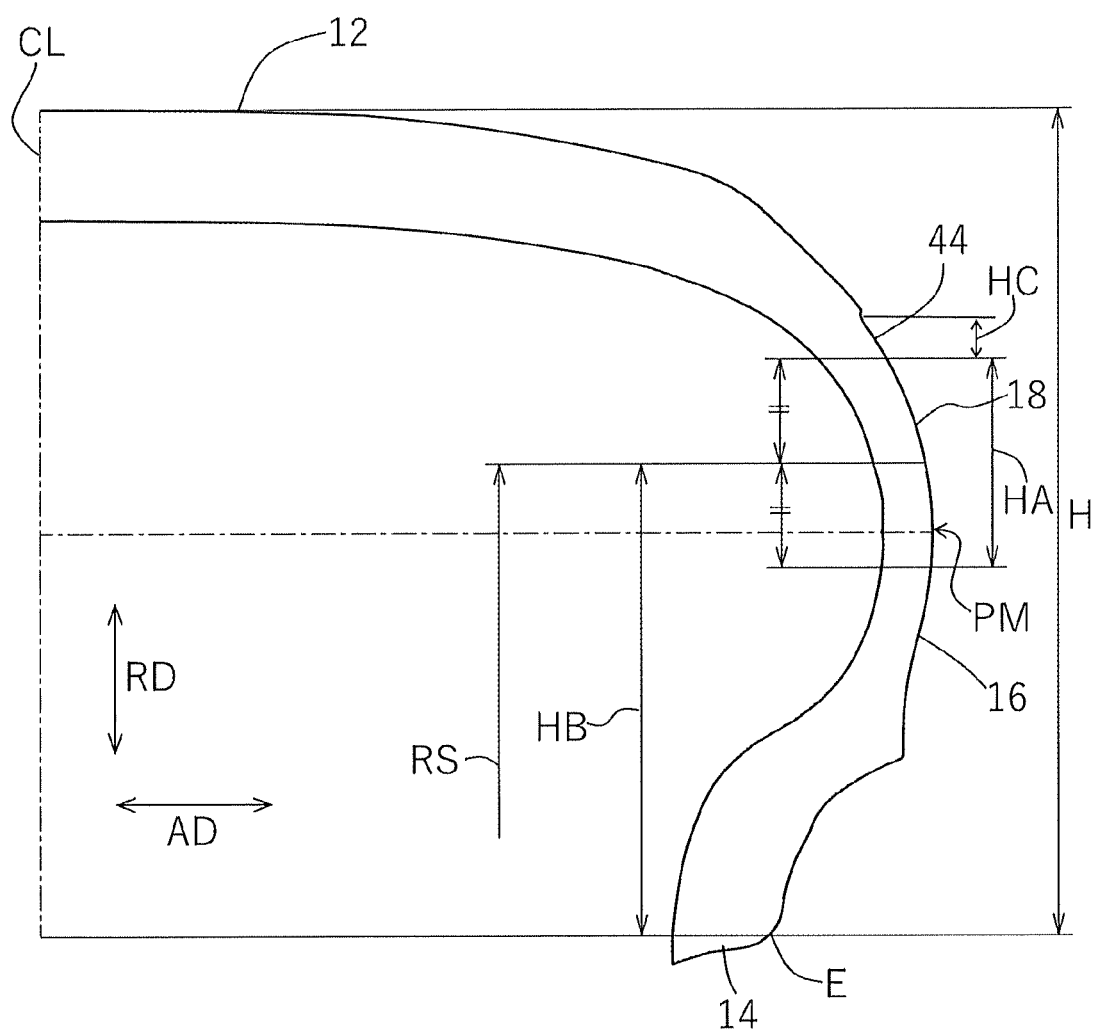
FIG. 1 is a half cross-sectional view of a pneumatic tire according to a first embodiment.

FIG. 1 to FIG. 5 as views showing a pneumatic tire 10 according to a first embodiment. The pneumatic tire 10 includes a tread 12 forming a grounding surface, a right and left pair of bead parts 14 configured to be fixed to a rim, a right and left pair of sidewalls 16 interposed between the tread 12 and the bead parts 14. FIG. 1 is a half cross-sectional view of the pneumatic tire 10 obtained by cutting the pneumatic tire 10 at a meridian cross section including a tire rotation axis.

In the drawings, a symbol CL denotes a tire equatorial plane corresponding to the center in a tire axial direction. The tire axial direction is referred to also as a tire width direction, which is a direction parallel to the tire rotation axis and denoted by a symbol AD in the drawings. A tire radial direction is a direction perpendicular to the tire rotation axis, which is denoted by a symbol RD in the drawings. A tire circumferential direction is a direction in which the tire rotates about the tire rotation axis, which is denoted by a symbol CD in the drawings.

An internal structure of the pneumatic tire 10 is not particularly limited and a well-known structure can be adopted. The pneumatic tire generally includes, as the internal structure, a right and left pair of bead cores, a carcass ply hung across the pair of bead cores in a toroidal shape, and a belt arranged on an outer circumference of a crown part of the carcass ply. Such internal structure can be adopted.

A pattern forming area 18 is provided on a surface (namely, an outer surface) of at least one sidewall 16. The surface of the sidewall 16 is a side surface of the tire which is positioned on an outer side of the surface of the tread 12 in the tire axial direction AD, which can be seen in the tire axial direction AD when the pneumatic tire 10 is mounted to the rim. The surface of the sidewall 16 is formed by vulcanizing a sidewall rubber to be molded.

The pattern forming area 18 is provided at a part of the surface of the sidewall 16 in the tire radial direction RD in a tire cross-sectional shape shown in FIG. 1. A dimension of the pattern forming area 18 in the tire radial direction RD (hereinafter, referred to as a "height HA") is not particularly limited, but preferably 0.05 to 0.6 times of a tire cross-sectional height H, and more preferably 0.1 to 0.35 times thereof. Here, the tire cross-sectional height H indicates a vertical height from a bead heel E to a tire maximum diameter point (distance in the tire radial direction RD), which is ½ of a difference between a tire outer diameter and a rim diameter.

A position of the pattern forming area 18 is not particularly limited, but a base semidiameter height HB is preferably 0.45 to 0.65 times of the tire cross-sectional height H. Here, the base semidiameter height HB indicates a vertical height from an intermediate position where the height HA is divided into two to the bead heel E. A distance from the tire rotation axis to the intermediate position where the height HA is divided into two is referred to as a base semidiameter RS. In the example shown in FIG. 1, the pattern forming area 18 is provided at a position including a tire maximum width position PM. Here, the tire maximum width position PM indicates a position where a profile line of the tire surface in the sidewall 16 is the farthest from the tire equatorial plane CL in the tire axial direction AD, which is the position in the tire radial direction RD.

Figure 2:
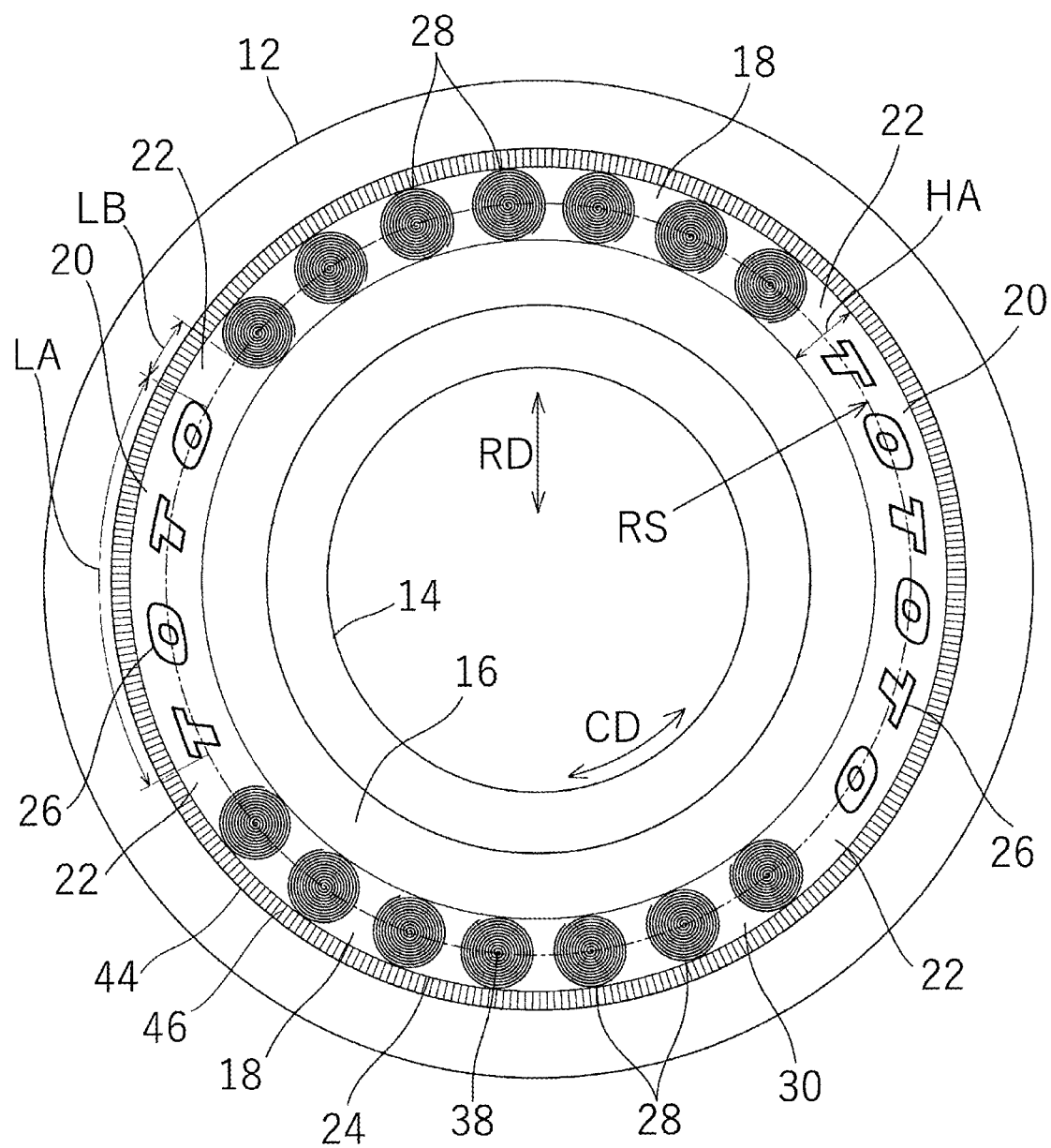
FIG. 2 is a side view of the pneumatic tire according to the first embodiment.

The pattern forming area 18 may be formed over the entire circumference in the tire circumferential direction CD; however, the pattern forming area 18 is formed at part in the tire circumferential direction CD as shown in FIG. 2 in this example. Specifically, a plurality of (two in this case) pattern forming areas 18, 18 having a curved band-shape are provided at intervals in the tire circumferential direction CD. Marking areas 20, 20 are provided to be interposed between the plural pattern forming areas 18, 18, and flat areas 22 are provided between the pattern forming areas 18 and the marking areas 20. These pattern forming areas 18, the marking areas 20, and the flat areas 22 form an annular decorative area 24 extending in the entire circumference in the tire circumferential direction CD.

The marking area 20 is an area where a marking 26 is formed. The marking 26 is formed of letters (including numbers), a symbol, a figure, a combination of them, or the like, indicating various display information such as a manufacturer, a brand, a type, and a size of the tire. The marking 26 may either protrude or be recessed, or may be provided in a recessed shape inside a protruding edged part, which is not particularly limited. In the example shown in FIG. 2, the markings 26 which are "TOTO" and "TOTOTO" are provided in the marking areas 20.

The flat area 22 is an area formed of a flat surface where the marking 26 or a later-described pattern 28 is not provided. A length LB of the flat area 22 in the tire circumferential direction CD (namely, a length at a position of the base semidiameter RS) is not particularly limited, but preferably 3 mm or more. The length LB is preferably 0.6 times or less of a length LA of the marking area 20 in the tire circumferential direction CD (namely, a length at the position of the base semidiameter RS). As the length LB is 0.6 times or less of the length LA, the length of the pattern forming area 18 in the tire circumferential direction CD can be secured to thereby increase decorative effects.

As shown in FIG. 2, a plurality of patterns 28 are provided in the pattern forming area 18 at intervals in the tire circumferential direction C). In this example, the patterns 28 are provided so as to fill and decorate spaces between the marking areas 20, 20 provided at intervals in the tire circumferential direction CD. Accordingly, the pattern forming area 18 can be regarded as a decorative area for filling the space between the marking areas 20, 20. In the example shown in FIG. 2, all plural patterns 28 have the same shape in planar view; however, the patterns 28 may have shapes different from one another.

Figure 3:
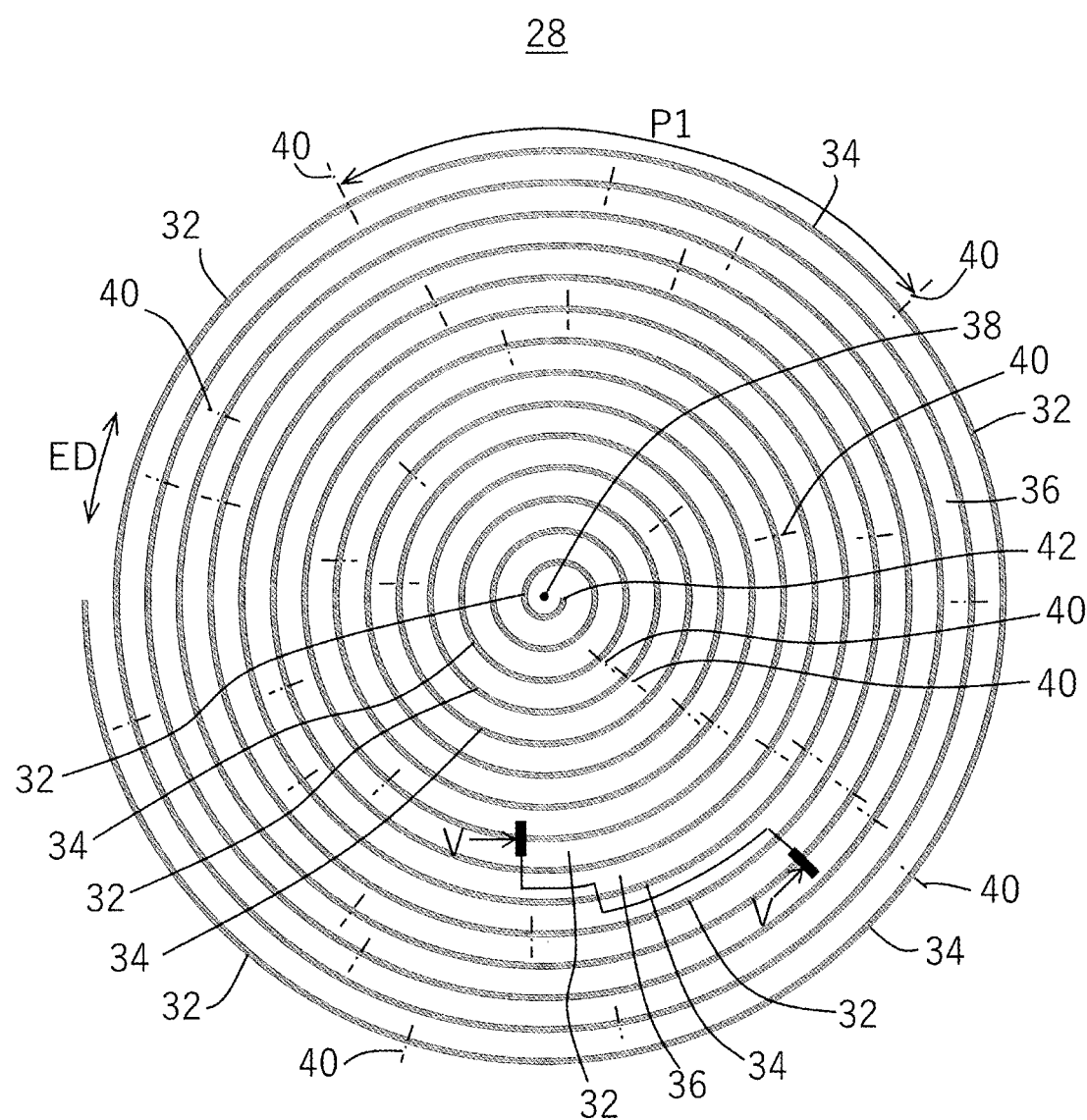
FIG. 3 is a plan view of a pattern provided in a pattern forming area of the first embodiment.

As shown in FIG. 3, the pattern 28 is formed in a spiral shape in planar view. That is, the pattern 28 is formed by a streak circling about a central point 38 like a swirl. Here, the planar view means viewing of the pattern 28 in a planar manner. FIG. 3 is a view showing the patter 28 in planar view. The central point 38 is disposed at the intermediate position where the height HA of the pattern forming area 18 is divided into two, which corresponds to the position of the base semidiameter RS as shown in FIG. 2. The number of circles of the spiral in each pattern 28 is not particularly limited, and may be, for example, 8 to 30 as well as 10 to 20.

The pattern 28 has a spiral shape of a curved line, and an overall shape thereof is a circular shape in this example. However, the overall shape of the pattern 28 may be oval shapes (for example, an elliptical shape, an ovoid shape). The spiral is not limited to the shape of the curved line but may have a polygonal line shape in which straight lines are bent, which may be formed into polygonal shapes such as a tetragon, a pentagon, and a hexagon.

Figure 4:
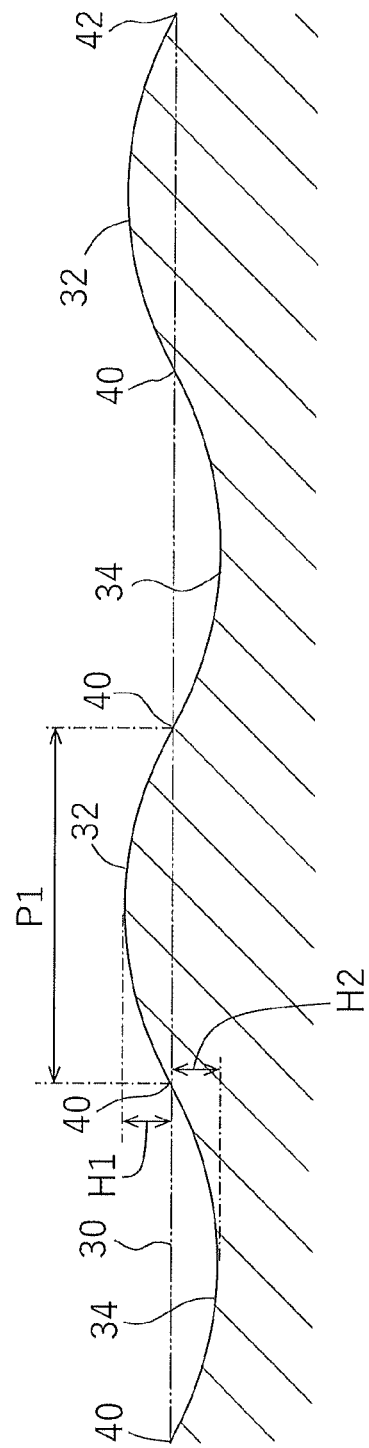
FIG. 4 is a cross-sectional view showing a cross-sectional shape along a spiral of the pattern.
Figure 5:
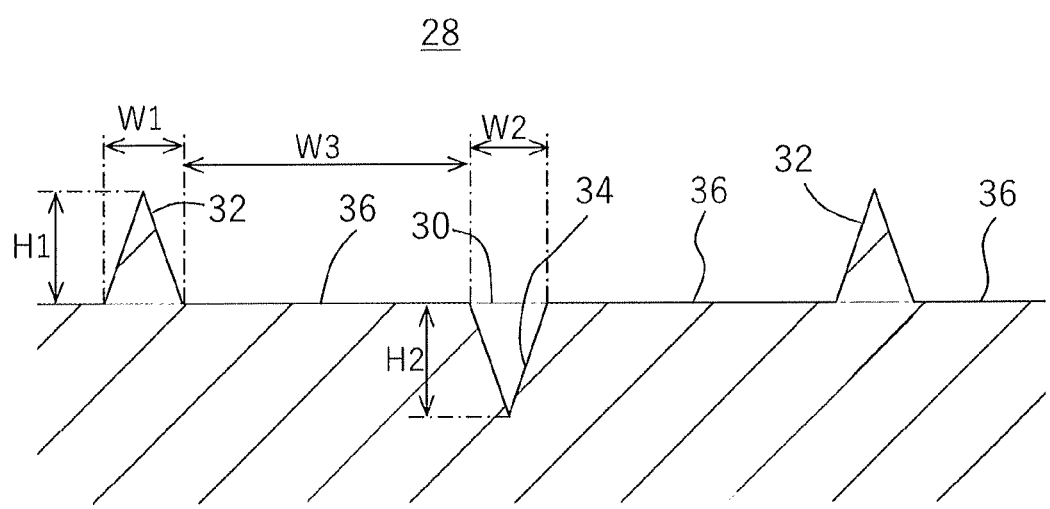
FIG. 5 is a cross-sectional view taken along V-V line of FIG. 3, showing a cross-sectional view of the pattern.

The pattern 28 is formed by alternately providing ridges 32 protruding from a reference surface 30 of the pattern forming area 18 and grooves 34 recessed from the reference surface 30 along the spiral while gradually changing the height and the depth with respect to the reference surface 30 as shown in FIG. 3 to FIG. 5. That is, the ridges 32 and the grooves 34 are alternately provided to be connected in an extended direction ED of the spiral as a streak extending so as to circle about the central point 38, thereby forming the pattern 28. The spiral is formed so as to circle through flat surfaces 36. The flat surface 36 with a fixed width is provided between a streak (the ridge 32 or the groove 34) and a streak (the ridge 32 or the groove 34) which are adjacent in an inward and outward direction. Here, the extended direction ED is a direction in which the streak forming the spiral extends so as to circle, which is referred to also as a circling direction.

The ridges 32 and the grooves 34 can be formed on the tire surface at the time of vulcanization molding, for example, by providing ridges and grooves in a mold used at the time of vulcanization molding of the tire by machine processing or laser processing.

The reference surface 30 is a surface to be a reference in the pattern forming area 18, and the ridges 32 and the grooves 34 are provided on the reference surface 30. The reference surface 30 may be a curved surface extending along the profile line of the tire surface in the sidewall 16 as shown in FIG. 1, or may be a curved surface or a flat surface in which the entire pattern forming area 18 is recessed from the profile line in a concave shape. If the reference surface 30 is the curved surface, a curvature thereof is small. Therefore, the reference surface 30 is a flat surface as compared with unevenness formed of the ridges 32 and the grooves 34.

The ridges 32 correspond to a component constituting streaks of one spiral together with the grooves 34, and a plurality of ridges 32 are included in one spiral. The ridges 32 are raised portions extending in thin streaks. The ridges 32 are formed in a triangular shape in cross section as shown in FIG. 5 in this example. A width W1 of the ridge 32 is not particularly limited, and may be, for example, 0.1 to 1 mm. Here, the width W1 of the ridge 32 is the maximum dimension in a width direction of the cross-sectional shape of the ridge 32, which is normally a width at a root part of the ridge 32. A maximum height H1 of the ridge 32 (namely, a distance from the reference surface 30 to an apex) is not particularly limited, but is preferably 0.1 to 0.8 mm, and more preferably 0.1 to 0.4 mm from a viewpoint of designability and securing a rubber amount therefor.

The grooves 34 correspond to a component constituting streaks of one spiral together with the ridges 34, and a plurality of grooves 34 are included in one spiral. The grooves 34 are recessed portions extending in thin streaks, which are also called thin grooves. The grooves 34 are formed in a triangular shape in cross section in this example. A width W2 of the groove 34 is not particularly limited, and may be, for example, 0.1 to 1 mm. Here, the width W2 of the groove 34 is the maximum dimension in a width direction of the cross-sectional shape of the grooves 34, which is normally a width at an opening surface of the groove 34. A maximum depth H2 of the groove 34 (namely, a distance from the reference surface 30 to a bottom) is not particularly limited, but preferably 0.1 to 0.8 mm, and more preferably 0.1 to 0.4 mm from a viewpoint of designability.

The width W1 of the ridge 32 and the width W2 of the groove 34 may be the same and may differ from each other. The width W1 is preferably 0.6 to 1.5 times of the width W2, and more preferably 0.8 to 1.2 times of the width W2 from a viewpoint of equalization in the rubber amount. The maximum height H1 of the ridge 32 and the maximum depth H2 of the groove 34 may be the same and may differ from each other. The maximum height H1 is preferably 0.6 to 1.2 times of the maximum depth H2, and more preferably 0.8 to 1.0 times of the maximum depth H2 from the viewpoint of equalization in the rubber amount. Volumes of the ridge 32 and the groove 34 are not particularly limited, but the volume of the groove 34 is preferably 0.8 to 1.2 times of the volume of the ridge 32, and more preferably 0.9 to 1.1 times of the volume of the ridge 32.

The flat surfaces 36 are surfaces extending along the reference surface 30, namely, even surfaces corresponding to the reference surface 30. The flat surfaces 36 are interposed between spiral-shaped streaks formed of the ridges 32 and the grooves 34. Accordingly, the flat surfaces 36 are thin band-shaped surfaces extending in a spiral shape about the central point 38. A width W3 of the flat surface 36 is not particularly limited, and preferably, for example, 0.1 to 2 mm, more preferably 0.2 to 1.0 mm. The width W3 of the flat surface 36 may be set to be smaller than a sum of the maximum height H1 of the ridge 32 and the maximum depth H2 of the groove 34. In that case, light attenuation effects can be increased, which can make the pattern 28 look darker. The width W3 of the flat surface 36 may be set to be larger than the sum of the maximum height H1 of the ridge 32 and the maximum depth H2 of the groove 34. In that case, surfaces on which light is reflected in the tire axial direction AD are increased; therefore, portions looking light are increased and dark portions look thin, which makes dark lines look clearer.

As shown in FIG. 4, the height and the depth with respect to the reference surface 30 in the spiral-shaped pattern 28 are gradually changed in the extended direction ED. Specifically, as the height is gradually reduced from a portion of the ridge 32 protruding from the reference surface 30, the portion is continued to a portion of the groove 34 which is recessed from the reference surface 30. Then, the depth of the groove 34 is gradually increased to be the maximum depth H2. Next, as the depth is gradually reduced, the groove 34 is continued to a portion of the ridge 32 protruding from the reference surface 30. Then, the height of the ridge 32 is gradually increased to be the maximum height H1. The above changes are repeated, thereby alternately providing the ridges 32 and the grooves 34.

In the example shown in FIG. 4, a cross-sectional shape along the spiral of the pattern 28 is a curved-line shape corresponding to sign waves. The cross-sectional shape is not limited to the curved-line shape but may be the polygonal line shape inclining in straight lines.

Switching positions 40 between the ridge 32 and the groove 34 exist at every fixed length P1 of the spiral as shown in FIG. 3 and FIG. 4. Here, the switching position 40 is a boundary between the ridge 32 and the groove 34. The switching positions 40 are shown by chain lines crossing the spiral in FIG. 3, and 36 switching positions 40 exist in this example. The fixed length P1 of the spiral means a fixed length which is a length of a streak (a length in the extended direction ED) in the spiral forming the pattern 28.

As shown in FIG. 3 and FIG. 4, the spiral-shaped pattern 28 starts as the ridge 32 from a start point 42 near the central point 38, and the height thereof is gradually increased to reach the maximum height H1, then, the height thereof is gradually reduced, and the ridge 32 is continued to the groove 34 through the switching position 40 corresponding to the reference surface 30. The depth of the groove 34 is gradually increased to reach the maximum depth H2, then, the depth thereof is gradually reduced, and the groove 34 is continued to the ridge 32 through the switching position 40 corresponding to the reference surface 30. In this example, an interval of the switching positions 40 is set to the fixed length P1. The length P1 is not particularly limited, and may be set to, for example, 10 to 60 times of a sum of the maximum height H1 and the maximum depth H2 (H1+H2).

Respective dimensions of the pattern 28 may be set as follows in an example. The height HA of the pattern forming area 18 is 25 mm, the width W1 of the ridge 32 is 0.2 mm, the maximum height H1 is 0.4 mm, the width W2 of the groove 34 is 0.2 mm, the maximum depth H2 is 0.4 mm, the width W3 of the flat surface 36 is 1.2 mm, and the number of circles of the spiral in each pattern 28 is 14.

According to the first embodiment, the pattern 28 is formed by including not only the ridges 32 but the ridges 32 and the grooves 34. Accordingly, the rubber amount can be equalized between the portion where the pattern 28 is provided and the portion where the pattern 28 is not provided. Specifically, the rubber amount for providing the ridges 32 can be compensated by portions for providing the grooves 34; therefore, the rubber amount can be equalized in the tire circumferential direction CD. Moreover, the pattern 28 is formed in a spiral shape so that the ridges 32 and the grooves 34 are alternately provided while gradually changing the height and the depth with respect to the reference surface 30; therefore, variations in rubber amount can be small even in the pattern 28. Accordingly, it is possible to suppress occurrence of light spot (namely, hollow or underfill) at the time of vulcanization molding of the pneumatic tire 10.

As the switching positions 40 between the ridge 32 and the groove 34 exist at every fixed length P1, the lengths of the ridges 32 and the grooves 34 are equalized, which can equalize the rubber amount also according to this point.

Moreover, the pattern 28 is formed to circle in the spiral shape through the flat surfaces 36, which is provided so that the ridges 32 and the groove 34 are alternately connected while gradually changing the height and the depth. Accordingly, surfaces on which light is reflected are increased, and the reflection surfaces can be variously changed in the extended direction ED of the spiral. Therefore, light attenuation effects can be increased, which can make the pattern 28 look darker in appearance. Consequently, it is possible to further increase contrast between portions where the pattern 28 is not provided and which look light in appearance (for example, portions between the pattern 28 and the pattern 28, or the flat areas 22) and the patterns 28 which look dark.

As shown in FIG. 2, a band-shaped area 44 in which a plurality of ridges (second ridges) 46 extending in the tire radial direction RD are provided at equal intervals in the tire circumferential direction CD is provided at an outer side in the tire radial direction RD of the pattern forming areas 18 in the first embodiment. The plural ridges 46 are arranged at equal intervals of 0.3 mm to 1.0 mm in the tire circumferential direction CD according to the embodiment. The band-shaped area 44 may be provided at part of the circumference in the tire circumferential direction CD, but is provided over the entire circumference in the tire circumferential direction CD in this example. Accordingly, the band-shaped area 44 is formed in an annular shape adjacent to the outside of the decorative area 24 and surrounding the entire circumference thereof. A dimension HC (see FIG. 1) of the band-shaped area 44 in the tire radial direction RD is preferably 5 to 12 mm.

When the above band-shaped area 44 is provided, interface irregularities and light spot between members of the tread 12 and the sidewall 16 can be suppressed. Moreover, the black band-shaped area 44 is formed by light attenuation effects obtained by providing the ridges 46, which can emphasize the pattern forming area 18.

Second Embodiment

Figure 6:
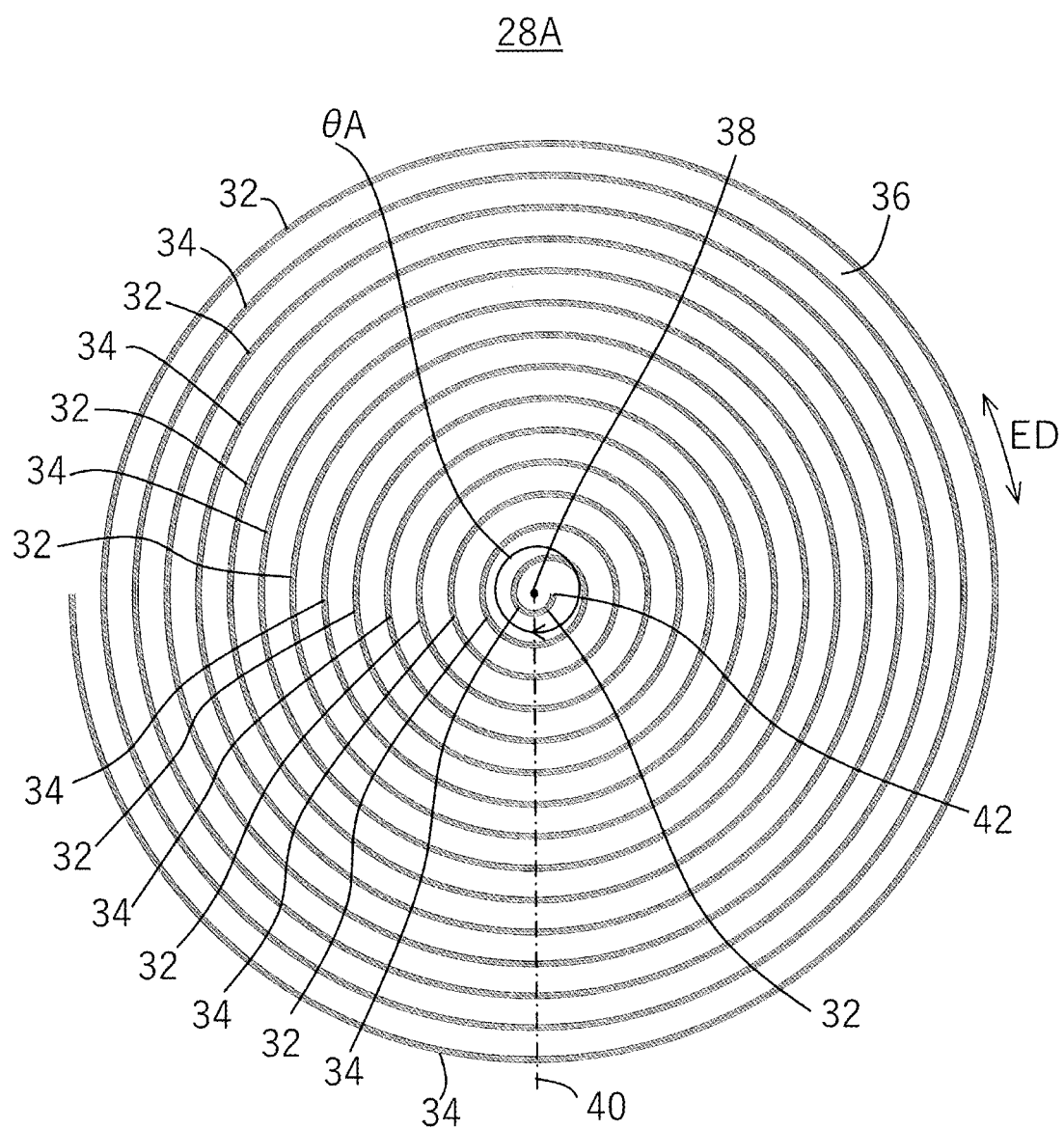
FIG. 6 is a plan view showing switching positions in the pattern according to a second embodiment.

FIG. 6 is a view showing a plan view of a pattern 28A in a pneumatic tire according to a second embodiment. The second embodiment differs from the first embodiment in setting of the switching position 40 between the ridge 32 and the groove 34.

In the second embodiment, the switching positions 40 between the ridge 32 and the groove 34 are set at every fixed angle θA about the central point 38 of the spiral. FIG. 6 shows an example in which the angle θA is set to 360 degrees, and the switching positions 40 are denoted by a chain line.

Specifically, the spiral-shaped pattern 28A starts as the ridge 32 from the start point 42 near the central point 38, and the height thereof is gradually reduced until circling by approximately 45 degrees in a clockwise direction, then, the ridge 32 reaches the switching position 40 to be continued to the groove 34. The depth of the groove 34 is gradually increased to reach the maximum depth H2 when circling by 180 degrees, then, the depth is gradually reduced, and the groove 34 reaches the switching position 40 when further circling by 180 degrees (360 degrees in total) to be continued to the ridge 32. The height of the ridge 32 is gradually increased to reach the maximum height H1 when circling by 180 degrees, then, the height is gradually reduced, and the pattern 28A reaches the switching position 40 when further circling by 180 degrees (360 degrees in total). The spiral-shaped pattern 28A is formed by repeating the above.

When the switching positions 40 are set at every fixed angle θA as described above, the angle θA is not particularly limited, but is preferably 30 to 360 degrees, more preferably 60 to 360 degrees.

In the example shown in FIG. 6, the ridges 32 and the grooves 34 are adjacent to each other through the flat surfaces 36 over the entire circumference in the extended direction ED of the spiral. Accordingly, light attenuation effects can be further increased, which can make the pattern 28 look darker and can increase the contrast. In order to make the ridges 32 and the grooves 34 adjacent to each other over the entire circumference in the extended direction ED of the spiral, the angle θA is set so that 360°/θA will be an odd number.

Other structures and advantages of the second embodiment are the same as those of the first embodiment, and explanation thereof is omitted.

Third Embodiment

Figure 7:
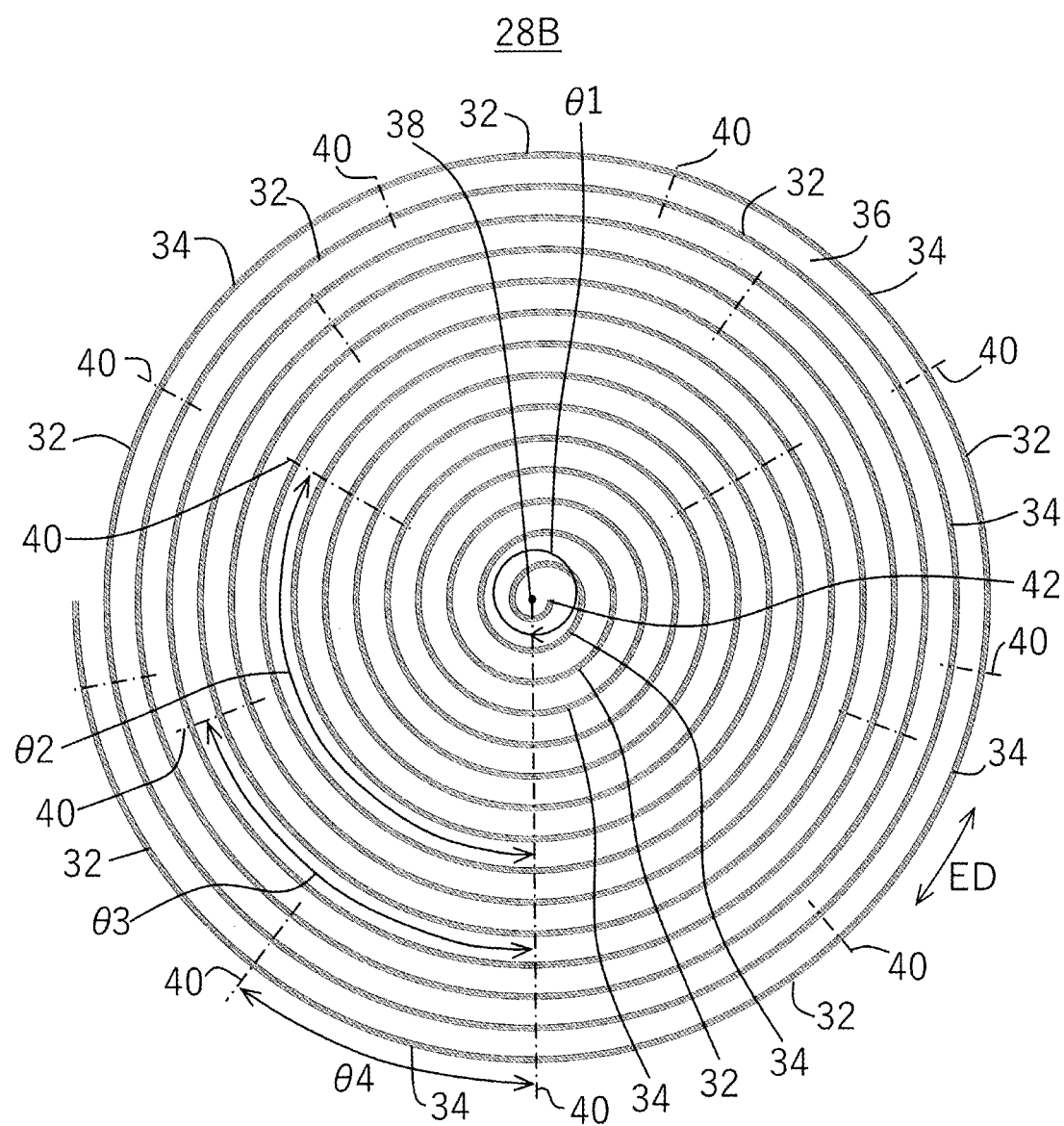
FIG. 7 is a plan view showing switching positions in the pattern according to a third embodiment.

FIG. 7 is a plan view showing a pattern 28B in a pneumatic tire according to a third embodiment. The third embodiment differs from the first embodiment in setting of the switching positions 40 between the ridge 32 and the groove 34.

In the third embodiment, the switching positions 40 between the ridge 32 and the groove 34 are set according to the angle about the central point 38 of the spiral, and the angle on a central side of the spiral is set to be larger than the angle on an outer side in the spiral. In FIG. 7, the switching positions are denoted by chain lines.

In the example of FIG. 7, the angle is set in four stages of θ1=360°, θ2=120°, θ3=72°, and θ4=40° from the inner side of the spiral. Specifically, the switching positions 40 are set by every 360 degrees until the spiral circles four times from the start point 42 near the central point 38. The switching positions 40 are set by every 120 degrees until the spiral further circles five times therefrom. The switching positions 40 are set by every 72 degrees until the spiral further circles three times therefrom. The switching positions 40 are set by every 40 degrees until the spiral further circles twice therefrom to the terminal.

In the spiral-shaped pattern 28B, the length of the streak becomes smaller as coming closer to the central side of the spiral, and becomes longer as going to an outer side of the spiral even at the same angle. Accordingly, the lengths of the ridges 32 and the grooves 34 can be equalized on the central side and the outer side of the spiral by setting the angle where the switching positions 40 are set to be smaller as going to the outer side of the spiral.

In the example shown in FIG. 7, each of the angles θ1 to θ4 is set so that 360°/θX (θX: θ1 to θ4) is an odd number. Accordingly, the ridges 32 and the groove 34 are formed to be adjacent to each other through the flat surfaces 36 over the entire circumference in the extended direction ED of the spiral. Accordingly, light attenuation effects can be further increased, which can make the pattern 28 look darker and can increase the contrast.

In the case where the angle on the central side of the spiral is set to be larger than the angle on the outer side of the spiral, the angle may be set when the spiral circles plural times so that the angle is increased in stages as described above; however, it is also preferable that the angle is set to be gradually increased from the central side toward the outer side. Other structures and advantages of the third embodiment are the same as those of the first embodiment, and explanation thereof is omitted.

OTHER EMBODIMENTS

Although the ridges 32 and the grooves 34 have the triangular shape in cross section in the above embodiments, the cross-sectional shape of the ridges 32 and the grooves 34 is not limited to this, and various cross-sectional shapes can be adopted.

Figure 8:
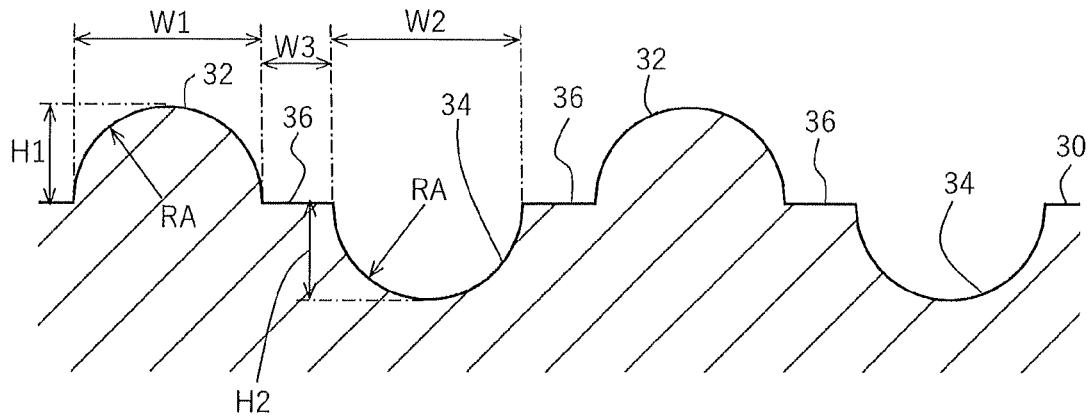
FIG. 8 is a cross-sectional view showing a first modification example of ridges and grooves which constitute a pattern.

FIG. 8 is a cross-sectional view showing a cross-sectional shape according to a first modification example. The ridges 32 and the grooves 34 have a semicircular shape in cross section in the first modification example. In this case, a curvature radius RA of the semicircle is not particularly limited, and for example, may be 0.1 to 0.5 mm.

Figure 9:
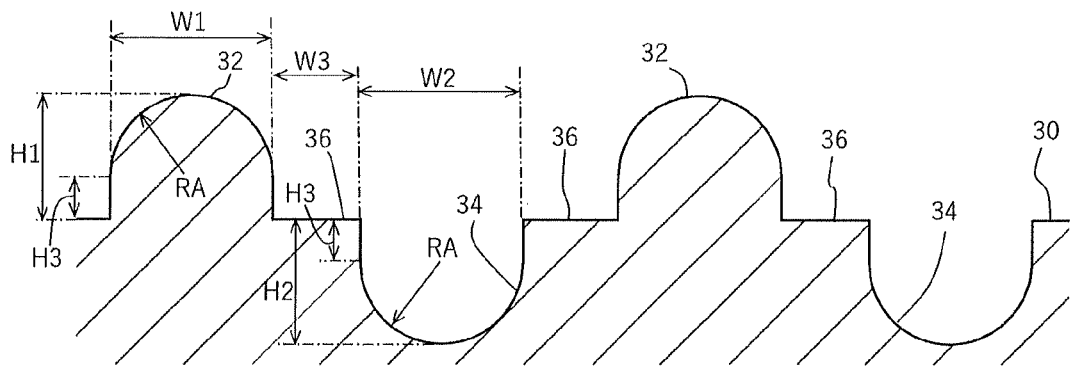
FIG. 9 is a cross-sectional view showing a second modification example of ridges and grooves which constitute a pattern.

FIG. 9 is a cross-sectional view showing a cross-sectional shape according to a second modification example. The ridges 32 and the grooves 34 have a shape in which a semicircle is raised by a rectangle in the second modification example. In this case, a curvature radius RA of the semicircle is not particularly limited, and for example, may be 0.1 mm or more, and 0.5 times or less of W1 or 0.5 times or less of W2. A raised amount H3 by the rectangle is preferably a value obtained by subtracting the curvature radius RA from the maximum height H1 of the ridge 32 or the maximum depth H2 of the groove 34.

Figure 10:
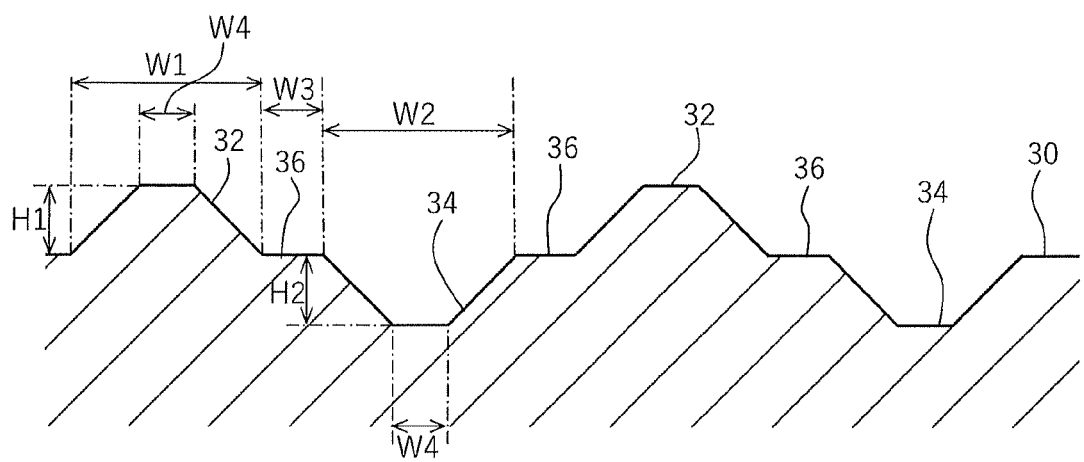
FIG. 10 is a cross-sectional view showing a third modification example of ridges and grooves which constitute a pattern.

FIG. 10 is a cross-sectional view showing a cross-sectional shape according to a third modification example. The ridges 32 and the grooves 34 have a trapezoidal shape in cross section in the third modification example, and an example of an isosceles trapezoid is shown. In this case, a dimension W4 of a base of the trapezoid corresponding to a top face of the ridge 32 and a bottom face of the groove 34 is preferably 0.2 to 0.5 times of the width W1 of the ridge 32 and the width W2 of the groove 34 respectively.

Figure 11:
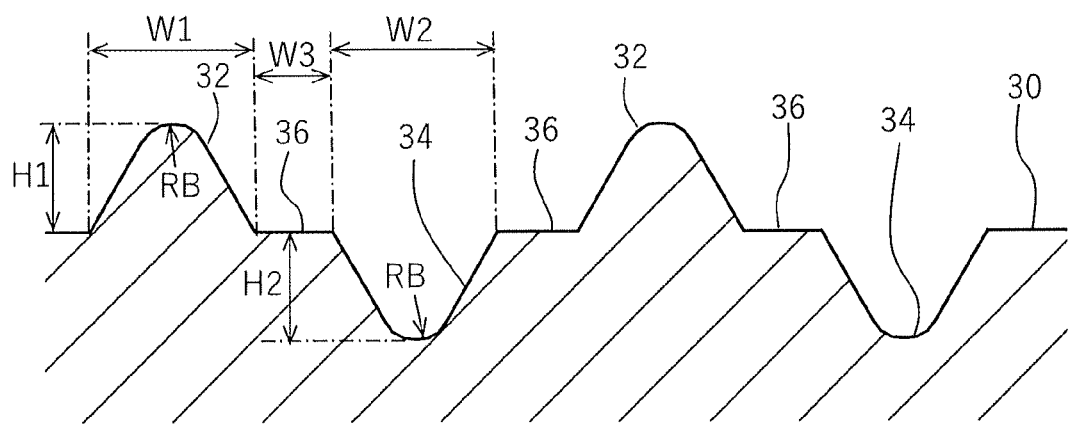
FIG. 11 is a cross-sectional view showing a fourth modification example of ridges and grooves which constitute a pattern.

FIG. 11 is a cross-sectional view showing a cross-sectional shape according to a fourth modification example. The ridges 32 and the grooves 34 have a cross-sectional shape in which an apex of a triangle is rounded by an arc in the fourth modification example. In this case, a curvature radius RB of the arc is not particularly limited, and for example, may be 0.1 mm or more, and 0.5 times or less of W1 or 0.5 times or less of W2.

Figure 12:
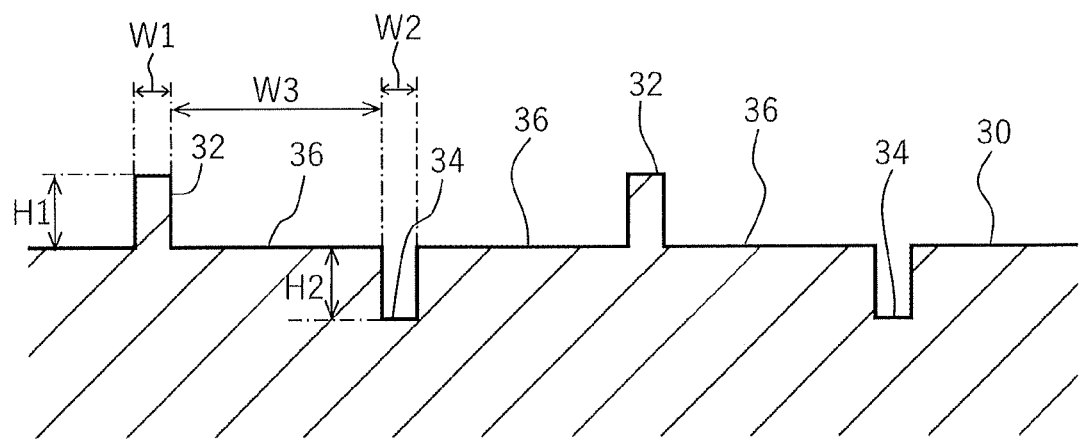
FIG. 12 is a cross-sectional view showing a fifth modification example of ridges and grooves which constitute a pattern.

FIG. 12 is a cross-sectional view showing a cross-sectional shape according to a fifth modification example. The ridges 32 and the grooves 34 have a rectangular shape in cross section in the fifth modification example.

In the modification examples shown in FIG. 8 to FIG. 12, the width W1 and the maximum height H1 of the ridge 32 and the width W2 and the maximum depth H2 of the groove 34 are the same as those in the first embodiment.

The pattern forming area 18 is provided separately from the marking area 20 in the above embodiments; however, the marking 26 may be provided within the pattern forming area 18. That is, for example, the spiral-shaped pattern 28 in the pattern forming area 18 is formed, and the marking 26 having a flat surface can be provided to be placed within the pattern 28.

The type of the pneumatic tire according to the embodiments is not particularly limited, and the pneumatic tire can be used for various tires including tires for passenger cars and tires for heavy loads such as trucks and buses.

The respective dimensions in the specification are values in an unloaded normal state where the pneumatic tire is fitted to a normal rim and is filled with a normal internal pressure. Examples of the normal rim include the "standard rim" in the JATMA standard, and the "Measuring Rim" in the TRA standard and in the ETRTO standard. Examples of the normal internal pressure include the "maximum air pressure" in the JATMA standard, the "maximum value" described in "TIRE LOAD LIMITS AT VARIOUS COLD INFLATION PRESSURES" in the TRA standard, and "INFLATION PRESSURE" in the ETRTO standard. However, the normal internal pressure is normally set to 180 kPa in the case of the tire for the passenger car, and set to 220 kPa in the case of a tire on which "Extra Load" or "Reinforced" is written.

The embodiments may include embodiments of (1) to (10) below.

(1) A pneumatic tire including a spiral-shaped pattern in a pattern forming area provided on a surface of a sidewall, in which the spiral-shaped pattern is formed by alternately providing ridges protruding from a reference surface in the pattern forming area and grooves recessed from the reference surface along a spiral while gradually changing the height and the depth with respect to the reference surface.

(2) The pneumatic tire described in (1), in which flat surfaces extending along the reference surface are interposed between spiral-shaped streaks formed of the ridges and the grooves.

(3) The pneumatic tire described in (1) or (2), in which switching positions between the ridge and the groove exist at every fixed length of the spiral.

(4) The pneumatic tire described in (1) or (2), in which switching positions between the ridge and the groove exist at every fixed angle about a central point of the spiral.

(5) The pneumatic tire described in (1) or (2), in which switching positions between the ridge and the groove are set according to an angle about the central point of the spiral, and the angle on a central side of the spiral is larger than the angle on an outer side of the spiral.

(6) The pneumatic tire described in (5), in which, when the angle about the central point is $\theta X$, the $\theta X$ is set so that $360°/\theta X$ will be an odd number.

(7) The pneumatic tire described in any one of (1) to (6), in which the pattern has a spiral shape of a curved line.

(8) The pneumatic tire described in any one of (1) to (7), in which a width of the ridge is 0.1 to 1 mm, the maximum height of the ridge is 0.1 to 0.8 mm, a width of the groove is 0.1 to 1 mm, and the maximum depth of the groove is 0.1 to 0.8 mm.

(9) The pneumatic tire described in any one of (1) to (8), in which a cross-sectional shape of the ridge and the groove includes a triangular shape, a semicircular shape, a shape in which a semicircle is raised by a rectangle, a trapezoidal shape, a shape in which an apex of a triangle is rounded by an arc, and a rectangular shape.

(10) The pneumatic tire described in any one of (1) to (9), in which an area where a plurality of second ridges extending in a tire radial direction are arranged at equal intervals in a tire circumferential direction is provided at an outer side in the tire radial direction of the pattern forming area, in which a dimension of the area in the tire radial direction is 5 mm or more to 12 mm or less.

Concerning a range of various numerical values described in the specification, an upper limit value and a lower limit value can be arbitrarily combined respectively, and all combinations are described as a preferable range of numerical values in the specification. The description of the range of numerical values "X to Y" means X or more to Y or less.

Some embodiments of the present invention have been explained above. These embodiments are cited as examples and do not intend to limit the scope of the invention. These embodiments can be achieved in other various modes, and various omissions, replacements, modifications may occur in a scope not departing from the gist of the invention. These embodiments and modifications thereof are included in the scope and the gist of the invention as well as included in the invention described in claims and the range of its equivalency.

REFERENCE SIGNS LIST

10: pneumatic tire
16: sidewall
18: pattern forming area
28, 28A, 28B: pattern
30: reference surface
32: ridge
34: groove
38: central point
40: switching position
44: band-shaped area
46: ridge (second ridge)

What is claimed is:

1. A pneumatic tire comprising a spiral-shaped pattern in a pattern forming area provided on a surface of a sidewall, wherein
the spiral-shaped pattern is formed by alternately providing ridges protruding from a reference surface in the pattern forming area and grooves recessed from the reference surface along an extension direction of the spiral-shaped pattern, and
a height of the ridges and a depth of the grooves with respect to the reference surface gradually change in the extension direction of the spiral-shaped pattern.

2. The pneumatic tire according to claim 1, wherein flat surfaces extending along the reference surface are interposed between segments of the spiral-shaped pattern in a radial direction outwardly from a central point of the spiral-shaped pattern.

3. The pneumatic tire according to claim 1, wherein each of the ridges switches into an adjacent one of the grooves in the extension direction of the spiral-shaped pattern at switching positions located at every fixed length of the spiral-shaped pattern.

4. The pneumatic tire according to claim 1, wherein each of the ridges switches into an adjacent one of the grooves in the extension direction of the spiral-shaped pattern at switching positions located at every fixed angle about a central point of the spiral-shaped pattern.

5. The pneumatic tire according to claim 1, wherein each of the ridges switches into an adjacent one of the grooves in the extension direction of the spiral-shaped pattern at switching positions set according to an angle about a central point of the spiral-shaped pattern, and a value of the angle at which the switching positions closer to the central point of the spiral-shaped pattern are set is larger than a value of the angle at which the switching positions further away from the central point of the spiral-shaped pattern are set.

6. The pneumatic tire according to claim 5, wherein, when the angle about the central point is $\theta X$, the $\theta X$ is set so that $360°/\theta X$ will be an odd number.

7. The pneumatic tire according to claim 1, wherein the spiral-shaped pattern is a spiral formed by a curved line.

8. The pneumatic tire according to claim 1, wherein a width of each of the ridges is 0.1 to 1 mm, a maximum height of each of the ridges is 0.1 to 0.8 mm, a width of each of the groove is 0.1 to 1 mm, and a maximum depth of each of the groove grooves is 0.1 to 0.8 mm.

9. The pneumatic tire according to claim 1, wherein a cross-sectional shape of each of the ridges and each of the grooves includes at least one of a triangular shape, a semicircular shape, a shape in which a semicircle is raised by a rectangle, a trapezoidal shape, a shape in which an apex of a triangle is rounded by an arc, and a rectangular shape.

10. The pneumatic tire according to claim 1, wherein an area where a plurality of second ridges extending in a tire radial direction are arranged at equal intervals in a tire circumferential direction is provided at an outer side in the tire radial direction of the pattern forming area, in which a dimension of the area in the tire radial direction is 5 mm or more to 12 mm or less.

* * * * *